United States Patent
Chi et al.

(10) Patent No.: US 12,498,937 B2
(45) Date of Patent: Dec. 16, 2025

(54) METHOD AND APPARATUS FOR ADJUSTING BOOT OPTION OF SERVER, NON-VOLATILE READABLE STORAGE MEDIUM, AND ELECTRONIC APPARATUS

(71) Applicant: SUZHOU METABRAIN INTELLIGENT TECHNOLOGY CO., LTD., Jiangsu (CN)

(72) Inventors: Jiangbo Chi, Jiangsu (CN); Mingyuan Lu, Jiangsu (CN); Dexin Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/116,924

(22) PCT Filed: Nov. 21, 2023

(86) PCT No.: PCT/CN2023/133029
§ 371 (c)(1),
(2) Date: Mar. 28, 2025

(87) PCT Pub. No.: WO2024/169300
PCT Pub. Date: Aug. 22, 2024

(65) Prior Publication Data
US 2025/0258677 A1    Aug. 14, 2025

(30) Foreign Application Priority Data

Feb. 16, 2023 (CN) .......................... 202310125049.9

(51) Int. Cl.
G06F 9/4401 (2018.01)
G06F 11/22 (2006.01)
(Continued)

(52) U.S. Cl.
CPC .......... *G06F 9/4401* (2013.01); *G06F 9/4408* (2013.01); *G06F 11/2268* (2013.01);
(Continued)

(58) Field of Classification Search
CPC .... G06F 9/4401; G06F 9/4406; G06F 9/4408; G06F 9/441; G06F 9/4416; G06F 13/382;
(Continued)

(56) References Cited

U.S. PATENT DOCUMENTS 9,280,433 B2 * 3/2016 Saretto ................ G06F 11/2284
10,754,660 B2 * 8/2020 Willoughby ........ H04L 63/0876
(Continued)

FOREIGN PATENT DOCUMENTS

CN          1991756 A      7/2007
CN        104239139 A     12/2014
(Continued)

OTHER PUBLICATIONS

The first search report of CN application No. 202310125049.9 issued on Mar. 23, 2023.
(Continued)

*Primary Examiner* — Thomas J. Cleary
(74) *Attorney, Agent, or Firm* — Scully, Scott, Murphy & Presser, P.C.

(57) ABSTRACT

A method and apparatus for adjusting a boot option of a server, a non-volatile readable storage medium, and an electronic apparatus are provided. The method for adjusting a boot option of a server includes: invoking, in response to detecting failure of an adjustment operation executed for a boot option of a target server, a first detection parameter corresponding to the target server; detecting a connection state of a universal serial bus (USB) port of the target server according to the first detection parameter; and adjusting, in response to determining that the USB port connection state
(Continued)

Default boot option configuration

Adjusted boot option configuration is used to indicate that a target USB port connected to a target USB device is provided on the target server, a boot option of a USB device to a target boot option of the target server.

19 Claims, 4 Drawing Sheets

(51) Int. Cl.
    *G06F 13/38*       (2006.01)
    *G06F 13/42*       (2006.01)

(52) U.S. Cl.
    CPC ........ *G06F 13/382* (2013.01); *G06F 13/4282* (2013.01); *G06F 2213/0042* (2013.01)

(58) Field of Classification Search
    CPC ......... G06F 13/4282; G06F 2213/0042; G06F 11/22; G06F 11/2205; G06F 11/2268
    See application file for complete search history.

(56) References Cited

U.S. PATENT DOCUMENTS

| | | | |
|---|---|---|---|
| 2006/0224880 A1* | 10/2006 | Hara | G06F 9/4401 713/2 |
| 2006/0282652 A1* | 12/2006 | El-Haj-Mahmoud | G06F 9/4408 713/1 |
| 2007/0043888 A1* | 2/2007 | Suzuki | G06F 3/0611 710/62 |
| 2008/0288766 A1* | 11/2008 | Inoue | G06F 9/455 713/2 |
| 2009/0113198 A1* | 4/2009 | Liu | H04L 41/0803 713/2 |
| 2012/0005468 A1* | 1/2012 | Yu | G06F 11/1417 711/E12.103 |
| 2014/0237223 A1* | 8/2014 | Chudgar | G06F 9/4408 713/2 |
| 2015/0172128 A1* | 6/2015 | Nittur | H04L 41/0894 709/223 |
| 2016/0350166 A1 | 12/2016 | Andrews | |
| 2019/0384614 A1* | 12/2019 | Kondapi | G06F 9/4408 |
| 2022/0066784 A1* | 3/2022 | Ali | G06F 9/445 |

FOREIGN PATENT DOCUMENTS

| | | |
|---|---|---|
| CN | 104572197 A | 4/2015 |
| CN | 105677359 A | 6/2016 |
| CN | 109117195 A | 1/2019 |
| CN | 110018856 A | 7/2019 |
| CN | 110750404 A | 2/2020 |
| CN | 112860330 A | 5/2021 |
| CN | 113961257 A | 1/2022 |
| CN | 114816551 A | 7/2022 |
| CN | 115827111 A | 3/2023 |

OTHER PUBLICATIONS

The search report of PCT application No. PCT/CN2023/133029 issued on Jan. 26, 2024.
The second search report of CN application No. 202310125049.9 issued on Apr. 17, 2023.
The Written Opinion of PCT application No. PCT/CN2023/133029 issued on Jan. 26, 2024.

* cited by examiner

METHOD AND APPARATUS FOR ADJUSTING BOOT OPTION OF SERVER, NON-VOLATILE READABLE STORAGE MEDIUM, AND ELECTRONIC APPARATUS

CROSS-REFERENCE TO RELATED APPLICATIONS

The disclosure is a National Stage Filing of the PCT International Application No. PCT/CN2023/133029 filed on Nov. 21, 2023, which claims priority to Chinese Patent Application No. 202310125049.9, filed in the China National Intellectual Property Administration on Feb. 16, 2023 and entitled "Method and apparatus for adjusting boot option of server, storage medium, and electronic apparatus", the entire contents of which are herein incorporated by reference.

TECHNICAL FIELD

Examples of the disclosure relate to the technical field of computers, and particularly relate to a method and apparatus for adjusting a boot option of a server, a non-volatile readable storage medium, and an electronic apparatus.

BACKGROUND

In the related art, a server is configured with a plurality of boot options by default. Each of the plurality of boot options corresponds to a method for booting the server. Meanwhile, the plurality of boot options are assigned certain priorities. That is, the server will give priority to execution of higher priority boot option. However, in an actual application scene of the server, some boot options may not be allowed to boot the server in some special cases. For instance, when a client server used by a client has a fault and needs to undergo fault detection, the client server needs to be booted to obtain a fault diagnosis log and then analyze a cause of the fault. However, in consideration of confidentiality and security of the client, the client provides no system environment for the after-sales personnel. Thus, it is impossible to boot the server through the system environment, which makes it difficult for the after-sales personnel to collect the fault diagnosis log.

At present, the server may be booted with a universal serial bus (USB) device, such as a USB flash disk, in a process of client-side online faults, factory production, research, development and testing. A fixed USB port on a mainboard of the server has to be designated as a booting port of a system bootable disk, and a boot option of the USB device has to be adjusted to a target boot option of a target server. But because only the fixed USB port of the server may be used while the other ports are not supported, once booting fails, the server may only be rebooted. This will cause great inconvenience to users, production and testing. Especially, when dealing with a large number of servers, a lot of time will be consumed.

No effective solution has been put forward to solve a problem of low adjustment efficiency of a boot option of a server in the related art.

SUMMARY

Examples of the disclosure provide a method and apparatus for adjusting a boot option of a server, a non-volatile readable storage medium, and an electronic apparatus, so as to at least solve a problem of low adjustment efficiency of a boot option of a server in the related art.

One of the examples of the disclosure provides a method for adjusting a boot option of a server. The method includes:

invoking, in response to detecting failure of an adjustment operation executed for a boot option of a target server, a first detection parameter corresponding to the target server, where the first detection parameter is used to indicate a first detection order of all universal serial bus (USB) ports on the target server;

detecting a USB port connection state of the target server according to the first detection parameter, where the USB port connection state is used to indicate whether a USB port connected to a target USB device is provided on the target server; and adjusting, in response to determining that the USB port connection state is used to indicate that a target USB port connected to the target USB device is provided on the target server, a boot option of a USB device to a target boot option of the target server, where the boot option of the USB device is used to instruct the target server to be booted through a USB device which is connected with the target server, and the target boot option is a boot option used with a highest priority when a system of the target server is booted.

Optionally, detecting the USB port connection state of the target server according to the first detection parameter includes: determining a current USB port to be currently detected in a polling order indicated by the first detection parameter;

detecting a current connection state of the current USB port, where the current connection state is used to indicate whether the current USB port is connected to the target USB device;

in response to determining that the current connection state is used to indicate that the current USB port is connected to the target USB device, determining, that the USB port connection state is used to indicate that the USB port connected to the target USB device is provided on the target server, and determining the current USB port as the target USB port; and determining, in response to determining that the current connection state is used to indicate that the current USB port is not connected to the target USB device, a next USB port to-be-detected as a next current USB port in the polling order.

Optionally, after detecting the current connection state of the current USB port, the method further includes:

determining, in response to determining that the current connection state is used to indicate that the current USB port is not connected to the target USB device and the current USB port is a last USB port in the polling order, that the USB port connection state is used to indicate that the USB port connected to the target USB device is not provided on the target server.

Optionally, invoking the first detection parameter corresponding to the target server includes at least one of the following operations:

invoking a single-round order parameter corresponding to the target server and an exit condition parameter corresponding to the target server as the first detection parameter, where the single-round order parameter is used to indicate an order of polling all the USB ports in a single round of polling, and the exit condition parameter is used to indicate a condition of exiting polling detection of all the USB ports; and invoking a detection list corresponding to the target server as the first detection parameter, where all the USB ports are recorded in the polling order in the detection list.

Optionally, invoking the single-round order parameter and the exit condition parameter corresponding to the target server as the first detection parameter includes at least one of the following operations:

invoking the single-round order parameter corresponding to the target server and a polling frequency parameter corresponding to the target server as the first detection parameter, where the polling frequency parameter is used to indicate a frequency of polling all the USB ports; and invoking a single-round order parameter corresponding to the target server and a polling time parameter corresponding to the target server as the first detection parameter, where the polling time parameter is used to indicate duration of polling all the USB ports.

Optionally, the method further includes at least one of the following operations:

determining a reference USB port to be detected next in the polling order in a process of detecting the current connection state of the current USB port; and generating and displaying first prompt information, where the first prompt information is used to indicate that the reference USB port is the next to-be-detected USB port;

generating and displaying second prompt information in a process of detecting the current connection state of the current USB port, where the second prompt information is used to indicate that the current USB port is a currently detected USB port.

Optionally, generating and displaying second prompt information includes:

generating the second prompt information, where the second prompt information is used to indicate that the current USB port is the currently detected USB port and indicate the polling order; and displaying the second prompt information.

Optionally, detecting the current connection state of the current USB port includes: detecting whether the current USB port is connected to the USB device;

detecting, in response to detecting that the current USB port is connected to the USB device, a device type of the USB device connected to the current USB port; and determining, in response to determining that the device type is a target type, that the current USB port is connected to the target USB device.

Optionally, detecting the device type of the USB device connected to the current USB port includes:

accessing a file stored in the USB device; and determining, in response to determining that a boot file is accessed in the USB device, that the device type is the target type.

Optionally, the method further includes:

detecting whether an exit operation is executed on the target server in a process of detecting the USB port connection state of the target server according to the first detection parameter; and stopping, in response to detecting the exit operation, execution of the operation of detecting the USB port connection state of the target server according to the first detection parameter.

Optionally, detecting whether the exit operation is executed on the target server includes:

generating third prompt information, where the third prompt information is used to indicate a trigger condition of the exit operation; and displaying the third prompt information while detecting whether the exit operation is executed on the target server.

Optionally, before invoking the first detection parameter corresponding to the target server, the method further includes:

invoking, in response to detecting that an adjustment function of the boot option of the target server is triggered, a second detection parameter corresponding to the target server, where the second detection parameter is used to indicate a second detection order of all the USB ports on the target server;

detecting the USB port connection state of the target server in the second detection order; and determining, in response to determining that the USB port connection state is used to indicate that no target USB port connected to the target USB device is provided on the target server, that failure of the adjustment operation executed for the boot option of the target server is detected.

Optionally, before invoking the first detection parameter corresponding to the target server, the method further includes:

invoking, in response to detecting that an adjustment function of the boot option of the target server is triggered, a third detection parameter corresponding to the target server, where the third detection parameter is used to indicate a second port identifier of one USB port corresponding to the adjustment function;

detecting whether the USB port indicated by the second port identifier is connected to the target USB device; and determining, in response to detecting that the USB port indicated by the second port identifier is not connected to the target USB device, that failure of the adjustment operation executed for the boot option of the target server is detected.

Optionally, adjusting the boot option of the USB device to the target boot option of the target server includes:

detecting a first boot mode of a basis input output system (BIOS) carried by the target USB device, and detecting a second boot mode of the BIOS currently used by the target server, where boot modes of the BIOS include a unified extensible firmware interface (UEFI) mode and a Legacy mode; and adjusting the boot option of the USB device to the target boot option of the target server according to the first boot mode and the second boot mode.

Optionally, adjusting the boot option of the USB device to the target boot option of the target server according to the first boot mode and the second boot mode includes:

matching the first boot mode and the second boot mode; and adjusting, in response to determining that the first boot mode and the second boot mode are consistent, the boot option of the USB device to the target boot option of the target server.

Optionally, after matching the first boot mode and the second boot mode, the method further includes:

obtaining, in response to determining that the first boot mode and the second boot mode are inconsistent, a boot option order from the target server, where the boot option order is a use order of the boot option supported by the target server; and booting the target server in the boot option order.

Optionally, after adjusting the boot option of the USB device to the target boot option of the target server, the method further includes:

invoking a target program from the target USB device;

executing, in response to determining that the target program is a program having a fault detection function, the target program to obtain a target log from the target server; and conducting fault detection on the target server according to the target log.

Optionally, executing the target program to obtain the target log from the target server includes:

executing the target program to obtain a first log from a baseboard management controller (BMC) deployed on the target server and obtain a second log from an operating system (OS) corresponding to the target server; and determining the first log and the second log as the target log.

Optionally, executing the target program to obtain the first log from the BMC deployed on the target server and obtain the second log from the OS corresponding to the target server includes:

transmitting an intelligent platform management interface (IPMI) command to the target server, where the IPMI command is used to instruct reading a system event log (SEL) from the BMC deployed on the target server, and reading an interface description language (IDL) log of the BMC from a restful interface corresponding to the BMC; and determining the SEL and the IDL log as the first log; and obtaining a Dmesg log, an Mcelog log and a Message log from the operating system corresponding to the target server, where the second log includes the Dmesg log, the Mcelog log, and the Message log.

Another one of the examples of the disclosure further provides an apparatus for adjusting a boot option of a server. The apparatus includes:

a first invoking module configured to invoke, in response to detecting failure of an adjustment operation executed for a boot option of a target server, a first detection parameter corresponding to the target server, where the first detection parameter is used to indicate a first detection order of all USB ports on the target server;

a first detection module configured to detect a USB port connection state of the target server according to the first detection parameter, where the USB port connection state is used to indicate whether a USB port connected to a target USB device is provided on the target server; and an adjustment module configured to adjust, in response to determining that the USB port connection state is used to indicate that a target USB port connected to the target USB device is provided on the target server, a boot option of a USB device to a target boot option of the target server, where the boot option of the USB device is used to instruct the target server to be booted through a USB device which is connected with the target server, and the target boot option is a boot option used with a highest priority when a system of the target server is booted.

Another aspect of the examples of the disclosure further provides a non-volatile readable storage medium. The non-volatile readable storage medium stores a computer program. The computer program is configured to execute the method for adjusting a boot option of a server when executed by a processor.

Yet another aspect of the examples of the disclosure further provides an electronic apparatus. The electronic apparatus includes a memory, a processor, and a computer program stored in the memory and runnable on the processor. The processor executes the method for adjusting a boot option of a server through the computer program.

In the examples of the disclosure, the target server corresponds to the first detection parameter used to indicate the first detection order of all the USB ports on the target server. If the boot option of the server fails to be adjusted, the first detection parameter may be invoked first, and the USB port connection state of the target server may be detected in the first detection order indicated by the first detection parameter. Thus, whether there is a USB port connected to the target USB device on the target server can be determined. If the target USB port connected to the target USB device is provided on the target server, the boot option of the USB device is adjusted to the target boot option used by the target server with the highest priority when the system of the target server is booted. Thus, the boot option of the target server is successfully adjusted. That is, through the above operation mechanism, the server does not need to be rebooted after the boot option of the server fails to be adjusted, and all the USB ports on the target server may be continuously detected according to the first detection parameter. Thus, a lot of time wasted by rebooting of the server is saved, and adjustment efficiency of the boot option of the server is improved. Through the technical solution, a problem of low adjustment efficiency of the boot option of the server in the related art is solved, and a technical effect of improving adjustment efficiency of the boot option of the server is achieved.

BRIEF DESCRIPTION OF THE DRAWINGS

The accompanying drawings herein, which are incorporated in the description and a constitute part of the description, illustrate examples satisfying the disclosure and are used to explain principles of the disclosure together with the description.

To more clearly describe technical solutions in the examples of the disclosure or in the related art, the accompanying drawings required for description of the examples or the related art will be briefly introduced below. Obviously, those having ordinary skill in the art may also derive other accompanying drawings from these accompanying drawings without making inventive efforts.

DETAILED DESCRIPTION OF THE EMBODIMENTS

In order to make those having ordinary skill in the art better understand a solution of the disclosure, a technical solution of examples of the disclosure will be described clearly and completely below in conjunction with accompanying drawings of the examples of the disclosure. Obviously, the examples described are merely some examples rather than all examples of the disclosure. Based on the examples of the disclosure, all other examples obtained by those having ordinary skill in the art without making creative efforts should fall within the protection scope of the disclosure.

It should be noted that the terms such as "first" and "second" in the description and claims of the disclosure and in the drawings are used to distinguish between similar objects and not necessarily to describe a particular order or sequential order. It should be understood that data used in this way may be interchanged where appropriate, such that the examples of the disclosure described herein may be implemented in other sequences than those illustrated or described herein. Moreover, the terms "include", "comprise" and "have" as well as any variations thereof are intended to cover non-exclusive inclusion. For instance, a process, a method, a system, a product or a device including a series of operations or units does not need to be limited by those explicitly listed, and may include other operations or units not explicitly listed or inherent to these processes, methods, products, or devices.

Figure 1:
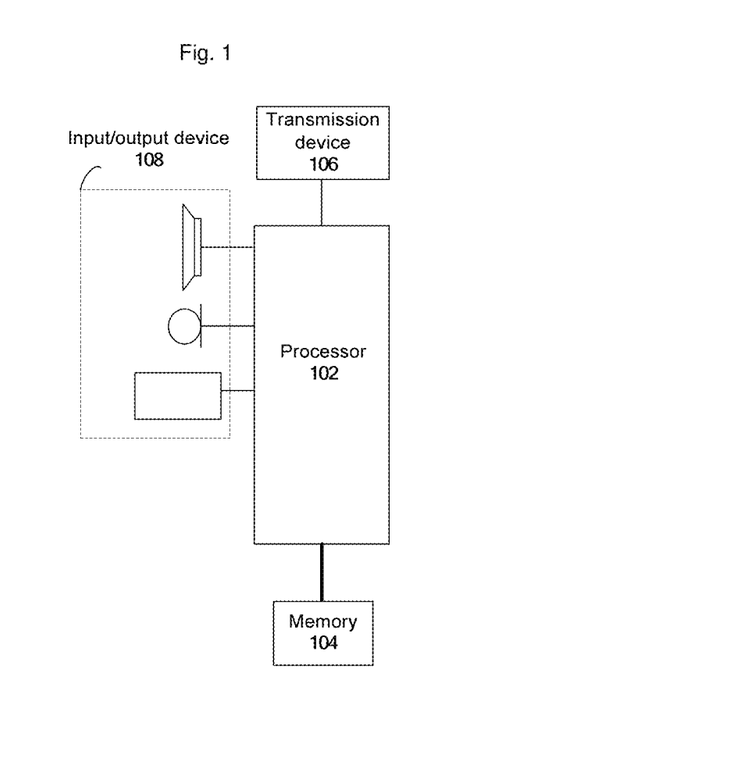
FIG. 1 is a schematic diagram of a hardware environment of a method for adjusting a boot option of a server according to an example of the disclosure.

Method examples provided by the examples of the disclosure may be executed in a computer terminal, a device terminal, or a similar computation apparatus. For instance, when running on the computer terminal, FIG. 1 is a schematic diagram of a hardware environment of a method for adjusting a boot option of a server according to an example of the disclosure. As shown in FIG. 1, the computer terminal may include one or more (only one is shown in FIG. 1) processors 112 (the processor 112 may include, but is not limited to, a processing apparatus, for instance, a microcontroller unit (MCU) or a field programmable gate array (FPGA)) and a memory 114 configured to store data. In an illustrative example, the computer terminal may further include a transmission device 116 having a communication function and an input/output device 118. Those having ordinary skill in the art may understand that a structure shown in FIG. 1 is merely illustrative and does not limit a structure of the computer terminal. For instance, the computer terminal may further include more or fewer components than those shown in FIG. 1, or have a different configuration having equivalent functions to those shown in FIG. 1 or more functions than those shown in FIG. 1.

The memory 114 may be configured to store a computer program such as a software program and module of application software, and for instance, the computer program corresponding to the method for adjusting a boot option of a server in the examples of the disclosure. The processor 112 executes various functional applications and data processing by running the computer program stored in the memory 114, that is, the method is implemented. The memory 114 may include a high-speed random access memory, or a non-volatile memory, and for instance, one or more magnetic storage apparatuses, flash memories, or other non-volatile solid-state memories. In some instances, the memory 114 may further include a memory remotely provided with respect to the processor 112, and the remote memories may be connected to the computer terminal through a network. Instances of the network include, but are not limited to, the Internet, an enterprise intranet, a local area network, a mobile communication network, and a combination thereof.

The transmission device 116 is configured to receive or transmit data through one network. Optional instances of the network may include a wireless network provided by a communication provider of the computer terminal. In an instance, the transmission device 116 includes a network interface controller (NIC), which may be connected to other network devices through a base station, so as to be in communication with the Internet. In an instance, the transmission device 116 may be a radio frequency (RF) module, which is configured to be in wireless communication with the Internet.

Figure 2:
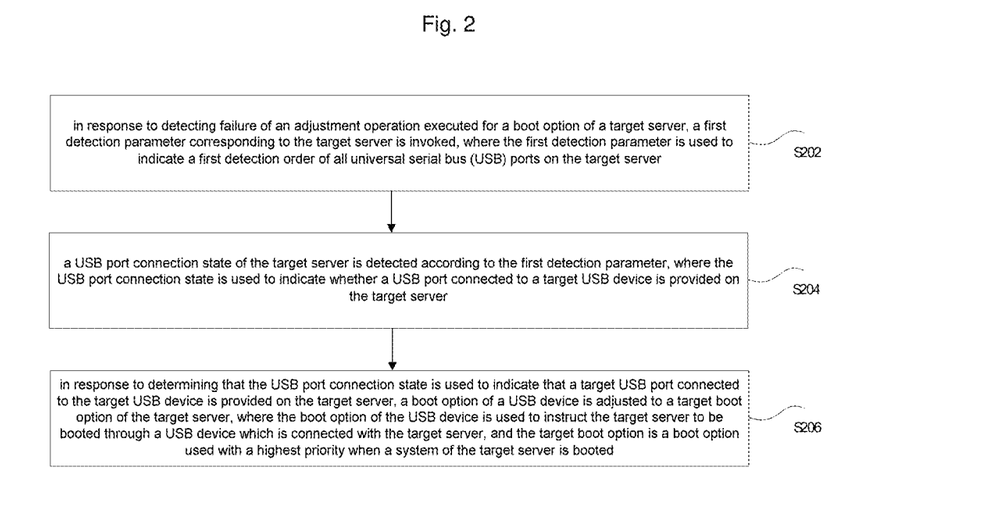
FIG. 2 is a flowchart of a method for adjusting a boot option of a server according to an example of the disclosure.

The example provides a method for adjusting a boot option of a server. FIG. 2 is a flowchart of a method for adjusting a boot option of a server according to an example of the disclosure. As shown in FIG. 2, the flow includes the following operations:

S202, in response to detecting failure of an adjustment operation executed for a boot option of a target server, a first detection parameter corresponding to the target server is invoked, where the first detection parameter is used to indicate a first detection order of all universal serial bus (USB) ports on the target server;

S204, a USB port connection state of the target server is detected according to the first detection parameter, where the USB port connection state is used to indicate whether a USB port connected to a target USB device is provided on the target server; and S206, in response to determining that the USB port connection state is used to indicate that a target USB port connected to the target USB device is provided on the target server, a boot option of a USB device is adjusted to a target boot option of the target server, where the boot option of the USB device is used to instruct the target server to be booted through a USB device which is connected with the target server, and the target boot option is a boot option used with a highest priority when a system of the target server is booted.

Through the operations, the target server corresponds to the first detection parameter used to indicate the first detection order of all the USB ports on the target server. If the boot option of the server fails to be adjusted, the first detection parameter may be invoked first, and the USB port connection state of the target server may be detected in the first detection order indicated by the first detection parameter. Thus, whether there is a USB port connected to the target USB device is provided on the target server can be determined. If the target USB port connected to the target USB device is provided on the target server, the boot option of the USB device is adjusted to the target boot option used by the target server with the highest priority when the system of the target server is booted. Thus, the boot option of the target server is successfully adjusted. That is, through the above operation mechanism, the server does not need to be rebooted after the boot option of the server fails to be adjusted, and all the USB ports on the target server may be continuously detected according to the first detection parameter. Thus, a lot of time wasted by rebooting of the server is saved, and adjustment efficiency of the boot option of the server is improved. Through the technical solution, a problem of low adjustment efficiency of the boot option of the server in the related art is solved, and a technical effect of improving adjustment efficiency of the boot option of the server is achieved.

It should be noted that the server is configured with a plurality of boot options by default, where each boot option corresponds to a method for booting a server, and meanwhile, the plurality of boot options may be assigned certain priorities, that is, the server may give priority to execution of higher priority boot option.

Optionally, in the example, the method for adjusting a boot option of a server may be applied to, but is not limited to, the target server, or may be applied to an independent device having a function of adjusting a boot option of a server other than the target server. For instance, the device may be a mobile terminal, a tablet computer, a personal computer (PC), etc.

In the technical solution provided by S202, different from the related art in which only a server may be rebooted after failure of an adjustment operation is detected, the technical solution provided by the disclosure may detect, in response to detecting that the adjustment operation executed for the boot option of the target server is failure, all the USB ports on the target server according to the first detection parameter.

Figure 3:
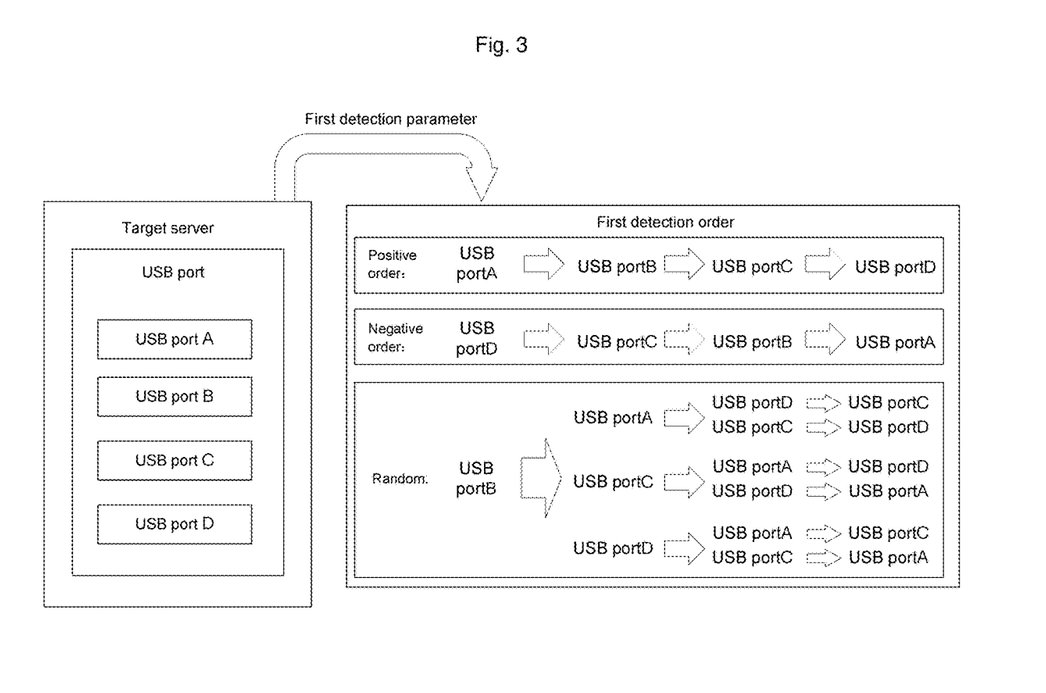
FIG. 3 is a schematic diagram of a first detection order according to an example of the disclosure.

Optionally, in the example, FIG. 3 is a schematic diagram of a first detection order according to an example of the disclosure. As shown in FIG. 3, for instance, the target server is provided with 4 USB ports, that is, a USB port A, a USB port B, a USB port C, and a USB port D. The first detection order may include, but is not limited to, one of the following cases:

case 1: a positive order, in which the USB port A, the USB port B, the USB port C and the USB port D are sequentially detected;

case 2: a negative order, in which the USB port D, the USB port C, the USB port B and the USB port A are sequentially detected; and case 3: a random order, which is different from the above two predetermined orders. In the random order, each USB port is selected for detection randomly, and a next detected USB port is randomly selected from undetected USB ports. For instance, if the USB port randomly detected for the first time is the USB port B, the USB port randomly detected for the second time is one USB port randomly selected from the undetected USB ports (the USB port A, the USB port C and the USB port D), and an identical logic is executed for the third time and the fourth time.

In an illustrative example, before the first detection parameter corresponding to the target server is invoked, the method may include, but is not limited to, the following method: in response to detecting that an adjustment function of the boot option of the target server is triggered, a second detection parameter corresponding to the target server is invoked, where the second detection parameter is used to indicate a second detection order of all the USB ports on the target server; the USB port connection state of the target server is detected in the second detection order; and in response to determining that the USB port connection state is used to indicate that no target USB port connected to the target USB device is provided on the target server, it is determined that failure of the adjustment operation executed for the boot option of the target server is detected.

Optionally, in the example, the adjustment function of the boot option of the target server may be triggered through the following method: a preset first hot key is executed, or the target server receives an instruction of executing the adjustment function of the boot option, which is not restrictive.

Optionally, in the example, the operation that in response to detecting that the adjustment function of the boot option of the target server is triggered, the adjustment operation executed for the boot option of the target server is detected may include, but is not limited to, the following operations: the USB port connection state of the target server is detected in the second detection order indicated by the second detection parameter, and in response to determining that the USB port connection state is used to indicate that no target USB port connected to the target USB device is provided on the target server, it is determined that failure of the adjustment operation executed for the boot option of the target server is detected. The second detection order may be consistent with the first detection order, which is not restrictive.

In an illustrative example, before the first detection parameter corresponding to the target server is invoked, the method may further include, but is not limited to, the following method: in response to detecting that the adjustment function of the boot option of the target server is triggered, a third detection parameter corresponding to the target server is invoked, where the third detection parameter is used to indicate a second port identifier of one USB port corresponding to the adjustment function; whether the USB port indicated by the second port identifier is connected to the target USB device is detected; and in response to detecting that the USB port indicated by the second port identifier is not connected to the target USB device, it is determined that failure of the adjustment operation executed for the boot option of the target server is detected.

Optionally, in the example, different from the method of detecting the USB port connection state of the target server in the second detection order, the method may determine whether the adjustment operation executed for the boot option of the target server fails according to a result of whether the USB port designated on the target server is connected to the target USB device. For instance, the third detection parameter corresponding to the target server may be invoked, the second port identifier of the one USB port corresponding to the adjustment function may be determined according to the third detection parameter, and whether the USB port indicated by the second port identifier is connected to the target USB device may be detected; and in response to detecting that the USB port indicated by the second port identifier is not connected to the target USB device, it may be determined that failure of the adjustment operation executed for the boot option of the target server is detected.

In the technical solution provided by S204, the USB port connection state may be, but is not limited to, a kind of state indicators of the target server. The USB port connection state is determined based on whether all the USB ports deployed on the target server are connected to the target USB device. Thus, the connection state of each of all the USB ports deployed on the target server may influence the USB port connection state of the target server.

Optionally, in the example, the first detection parameter may indicate the first detection order. All the USB ports on the target server are detected in the first detection order. The USB port connection state of the target server is determined according to a result of whether the USB port connected to the target USB device exists in all the USB ports. For instance, N USB ports are deployed on the target server. The N USB ports are detected in the first detection order. In response to detecting that a number of USB ports connected to the target USB device in the N USB ports is greater than or equal to 1, it is determined that the USB port connection state is used to indicate that the target USB port connected to the target USB device is provided on the target server. In response to detecting that the number of the USB ports connected to the target USB device in the N USB ports is equal to 0, it is determined that the USB port connection state is used to indicate that no target USB port connected to the target USB device is provided on the target server.

In an illustrative example, the operation that the USB port connection state of the target server is detected according to the first detection parameter may include, but is not limited to, the following method: a current USB port to be currently detected is determined in a polling order indicated by the first detection parameter; a current connection state of the current USB port is detected, where the current connection state is used to indicate whether the current USB port is connected to the target USB device; in response to determining that the current connection state is used to indicate that the current USB port is connected to the target USB device, it is determined that the USB port connection state is used to indicate that the USB port connected to the target USB device is provided on the target server, and the current USB port is determined as the target USB port; and in response to determining that the current connection state is used to indicate that the current USB port is not connected to the target USB device, a next USB port to-be-detected is determined as a next current USB port in the polling order.

Optionally, in the example, after the current USB port is determined as the target USB port, detection of connection states of the remaining USB ports of the target server according to the first detection parameter may be stopped, or connection states of the remaining USB ports of the target server continue to be detected according to the first detection parameter. In this case, a plurality of target USB ports may be obtained. Thus, one target USB port may be further selected from the plurality of target USB ports according to a preset priority rule.

In an illustrative example, after the current connection state of the current USB port is detected, the method may further include, but is not limited to, the following method: in response to determining that the current connection state is used to indicate that the current USB port is not connected to the target USB device and the current USB port is a last USB port in the polling order, it is determined that the USB port connection state is used to indicate that the USB port connected to the target USB device is not provided on the target server.

Optionally, in the example, the USB port on the target server is detected through polling. The last USB port in the polling order is a last USB port after execution of the polling order is completed. In response to determining that the current connection state is used to indicate that the current USB port is not connected to the target USB device and the current USB port is the last USB port in the polling order, that is, all the USB ports before the current USB port are not connected to the target USB device, it is determined that the USB port connection state is used to indicate that no USB port connected to the target USB device is provided on the target server.

In an illustrative example, the operation that the first detection parameter corresponding to the target server is invoked may include, but is not limited to, one of the following methods:
 a single-round order parameter and an exit condition parameter corresponding to the target server are invoked as the first detection parameter, where the single-round order parameter is used to indicate an order of polling all the USB ports once, and the exit condition parameter is used to indicate a condition of exiting polling detection of all the USB ports;
 a detection list corresponding to the target server is invoked as the first detection parameter, where all the USB ports are recorded in the polling order in the detection list.

Optionally, in the example, the operation that the first detection order is indicated by the first detection parameter may indicate, but is not limited to, the following method: a complete detection order is directly provided as the first detection order, and for instance, the detection list is used as the first detection parameter; and alternatively, the single-round order parameter and the exit condition parameter for polling detection of all the USB ports on the target server are specified. The order of polling all the USB ports once and the condition of exiting polling detection of all the USB ports may be determined according to the single-round order parameter and the exit condition parameter.

In an illustrative example, the operation that the single-round order parameter and the exit condition parameter corresponding to the target server are invoked as the first detection parameter may include, but is not limited to, one of the following methods: the single-round order parameter corresponding to the target server and a polling frequency parameter corresponding to the target server are invoked as the first detection parameter, where the polling frequency parameter is used to indicate a frequency of polling all the USB ports; and a single-round order parameter corresponding to the target server and a polling time parameter corresponding to the target server are invoked as the first detection parameter, where the polling time parameter is used to indicate duration of polling all the USB ports.

Optionally, in the example, the exit condition parameter may be, but is not limited to, the polling frequency parameter and the polling time parameter. In response to determining that the exit condition parameter is the polling frequency parameter, when polling of a frequency indicated by the polling frequency parameter is completed, polling detection is exited. In response to determining that the exit condition parameter is the polling time parameter, when duration of polling indicated by the polling time parameter is finished, polling detection is exited.

In an illustrative example, the method may further include, but is not limited to, at least one of the following methods:
 a reference USB port to be detected next is determined in the polling order in a process of detecting the current connection state of the current USB port; and first prompt information is generated and displayed, where the first prompt information is used to indicate that the reference USB port is the next to-be-detected USB port;
 second prompt information is generated and displayed in a process of detecting the current connection state of the current USB port, where the second prompt information is used to indicate that the current USB port is a currently detected USB port.

Optionally, in the example, the first prompt information may directly indicate that the reference USB port is the next USB port to-be-detected, such that a user may clearly know the next USB port to be polled. In this case, if a USB device is to be plugged in, the user may wait at a next USB port, identify and match a plugged bootable USB device, and create a bootable option, so as to achieve a plug-and-play effect.

In an illustrative example, the operation that the second prompt information is generated and displayed may include, but is not limited to, the following method: the second prompt information is generated, where the second prompt information is used to indicate that the current USB port is the currently detected USB port and indicate the polling order; and the second prompt information is displayed.

Optionally, in the example, the second prompt information may indicate that the current USB port is the currently detected USB port and indicate the polling order, such that the user may know the next USB port to be polled according to the polling order and the current USB port. In this case, if a USB device is to be plugged in, the user may wait at a next USB port, identify and match a plugged bootable USB device, and create a bootable option, so as to achieve a plug-and-play effect.

Optionally, in the example, the prompt information may be displayed in a form of sound, light, electricity, words, etc., such that the user may conveniently know the next USB port to be polled. In this case, if a USB device is to be plugged in, the user may wait at a next USB port, identify and match a plugged bootable USB device, and create a bootable option, so as to achieve a plug-and-play effect.

In an illustrative example, the operation that the current connection state of the current USB port is detected may include, but is not limited to, the following method: whether the current USB port is connected to the USB device is detected; in response to detecting that the current USB port is connected to the USB device, a device type of the USB device connected to the current USB port is detected; and in response to determining that the device type is a target type, it is determined that the current USB port is connected to the target USB device.

Optionally, in the example, the device type of the USB device may include the target type and a non-target type. In response to detecting that the current USB port is connected to the USB device, it may not be directly determined that the current USB port is connected to the target USB device, and the device type of the USB device connected to the current USB port further needs to be detected. In response to determining that the device type is the target type, it may be determined that the current USB port is connected to the target USB device.

In an illustrative example, the operation that the device type of the USB device connected to the current USB port is detected may include, but is not limited to, the following operations: a file stored in the USB device is accessed; and in response to determining that a boot file is accessed in the USB device, it is determined that the device type is the target type.

Optionally, in the example, in response to determining that the boot file is accessed in the USB device, it is determined that the device type is the target type. In response to determining that no boot file is accessed in the USB device, it is determined that the device type is the non-target type.

In an illustrative example, the method may further include, but is not limited to, the following method: whether an exit operation is executed on the target server is detected in a process of detecting the USB port connection state of the target server according to the first detection parameter; and in response to detecting the exit operation, execution of the operation of detecting the USB port connection state of the target server according to the first detection parameter is stopped.

Optionally, in the example, the exit operation may include, but is not limited to, the following operation: a preset second hot key is executed, or the target server receives an instruction of executing the exit operation.

In an illustrative example, the operation that whether the exit operation is executed on the target server is detected may include, but is not limited to, the following operations: third prompt information is generated, where the third prompt information is used to indicate a trigger condition of the exit operation; and the second prompt information is displayed while whether the exit operation is executed on the target server is detected.

Optionally, in the example, the third prompt information is used to indicate the trigger condition of the exit operation. For instance, the third prompt information is that "a second hot key is [Ctrl+F5], and if the user attempts to exit polling detection in advance, the user may directly press the second hot key to cancel polling detection".

Figure 4:
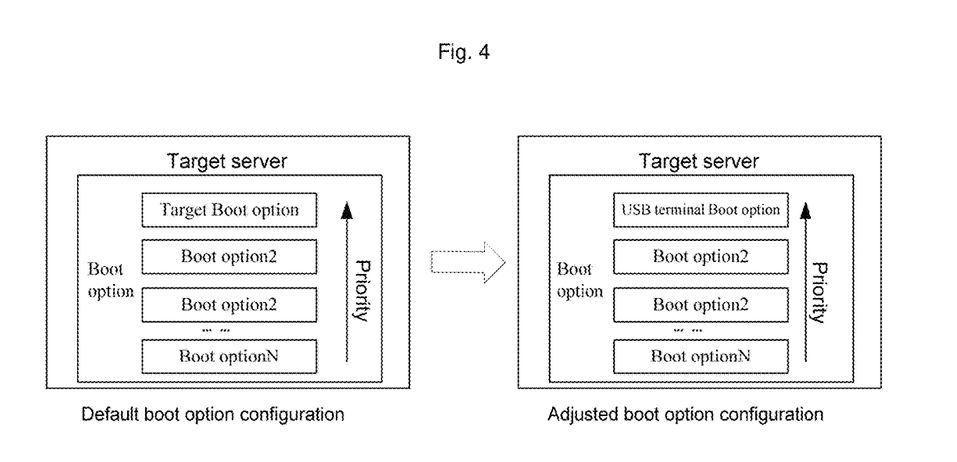
FIG. 4 is a schematic diagram of boot option adjustment according to an example of the disclosure.

In the technical solution provided by S206, the server is configured with a plurality of boot options by default, where each boot option corresponds to a method for booting a server, and meanwhile, the plurality of boot options may be assigned certain priorities. FIG. 4 is a schematic diagram of boot option adjustment according to an example of the disclosure. As shown in FIG. 4, boot options of a server are configured as a plurality of boot options (a target boot option, a boot option 2, a boot option 3, and a boot option N) by default, and a priority of an upper boot option is higher than that of a lower boot option. Thus, a boot option at a top level has a highest priority, and a target server boots a system of the target server according to the boot option with the highest priority. When the system with the highest priority cannot be used, a boot option with a second highest priority is used to boot the system of the target server. After a boot option of a USB device is adjusted to a target boot option of the target server, an adjusted configuration of the boot options is obtained, and the target server may be booted through a connected USB device.

In an illustrative example, the operation that the boot option of the USB device is adjusted to the target boot option of the target server may include, but is not limited to, the following method: a first boot mode of a basis input output system (BIOS) carried by the target USB device is detected, and a second boot mode of the BIOS currently used by the target server is detected, where boot modes of the BIOS include a unified extensible firmware interface (UEFI) mode and a Legacy mode; and the boot option of the USB device is adjusted to the target boot option of the target server according to the first boot mode and the second boot mode.

Optionally, in the example, the operation that the first boot mode of the basis input output system (BIOS) carried by the target USB device is detected includes the following method: whether a file carried by the target USB device is a UEFI file or a Legacy file is identified, and in response to determining that the file carried by the target USB device is the UEFI file, the first boot mode of the BIOS carried by the target USB device is determined as the UEFI mode; and in response to determining that the file carried by the target USB device is the Legacy file, the first boot mode of the BIOS carried by the target USB device is determined as the Legacy mode.

In an illustrative example, the operation that the boot option of the USB device is adjusted to the target boot option of the target server according to the first boot mode and the second boot mode may include, but is not limited to, the following method: the first boot mode and the second boot mode are matched; and in response to determining that the first boot mode and the second boot mode are consistent, the boot option of the USB device is adjusted to the target boot option of the target server.

Optionally, in the example, the boot option may be successfully created only after the first boot mode and the second boot mode are matched to correspond to each other, and a user is informed of imminent entrance to the USB device. Otherwise, the boot option cannot be created successfully.

In an illustrative example, after the first boot mode and the second boot mode are matched, the method may include, but is not limited to, the following method: in response to determining that the first boot mode and the second boot mode are inconsistent, a boot option order is obtained from the target server, where the boot option order is a use order of the boot option supported by the target server; and the target server is booted in the boot option order.

Optionally, in the example, as shown in FIG. 4, in response to determining that the first boot mode and the second boot mode are inconsistent, the target server is booted in the boot option order indicated by a default configuration of the boot option of the server.

In an illustrative example, after the boot option of the USB device is adjusted to the target boot option of the target server, the method may include, but is not limited to, the following method: a target program is invoked from the target USB device; in response to determining that the target program is a program having a fault detection function, the target program is executed to obtain a target log from the target server; and fault detection is conducted on the target server according to the target log.

Optionally, in the example, the target program is not limited to the program having the fault detection function, and may also be a program having other functions. Thus, operations corresponding to the programs may be executed, and include a data collection function, a data copy function, a data analysis function, a data addition, deletion and search function, etc. The disclosure conducts description with a scene where the target program is the program having the fault detection function and detects a server fault as an instance, and does not limit a type of the target program.

In an illustrative example, the operation that the target program is executed to obtain the target log from the target server may include, but is not limited to, the following operations: the target program is executed to obtain a first log from a baseboard management controller (BMC) deployed on the target server, and obtain a second log from an operating system (OS) corresponding to the target server; and the first log and the second log are determined as the target log.

Optionally, in the example, a source of the target log may include, but is not limited to, the baseboard management controller (BMC) and the operating system OS. The baseboard management controller (BMC) and the operating system (OS) record logs of a running process of the server. According to the target log, detailed information of the fault of the server may be analyzed and detected, and then the fault of the server is solved.

In an illustrative example, the operation that the target program is executed to obtain the first log from the baseboard management controller (BMC) deployed on the target server and obtain the second log from the operating system (OS) corresponding to the target server may include, but is not limited to, the following method: an intelligent platform management interface (IPMI) command is transmitted to the target server, where the IPMI command is used to instruct a system event log (SEL) to be read from the BMC deployed on the target server, and an interface description language (IDL) log of the BMC to be read from a restful interface corresponding to the BMC; the system event log (SEL) and the interface description language (IDL) log are determined as the first log; and a Dmesg log, an Mcelog log and a Message log are obtained from the operating system corresponding to the target server, where the second log includes the Dmesg log, the Mcelog log, and the Message log.

Optionally, in the example, the first log and the second log may include, but are not limited to, the above logs. Other logs may be collected if necessary. A corresponding collection hardware zone and mode are not limited herein.

In order to better understand a process of adjusting a boot option of the server, a flow of adjusting a boot option of the server will be described below in combination with optional examples, and is not intended to limit the technical solution of the examples of the disclosure.

Figure 5:
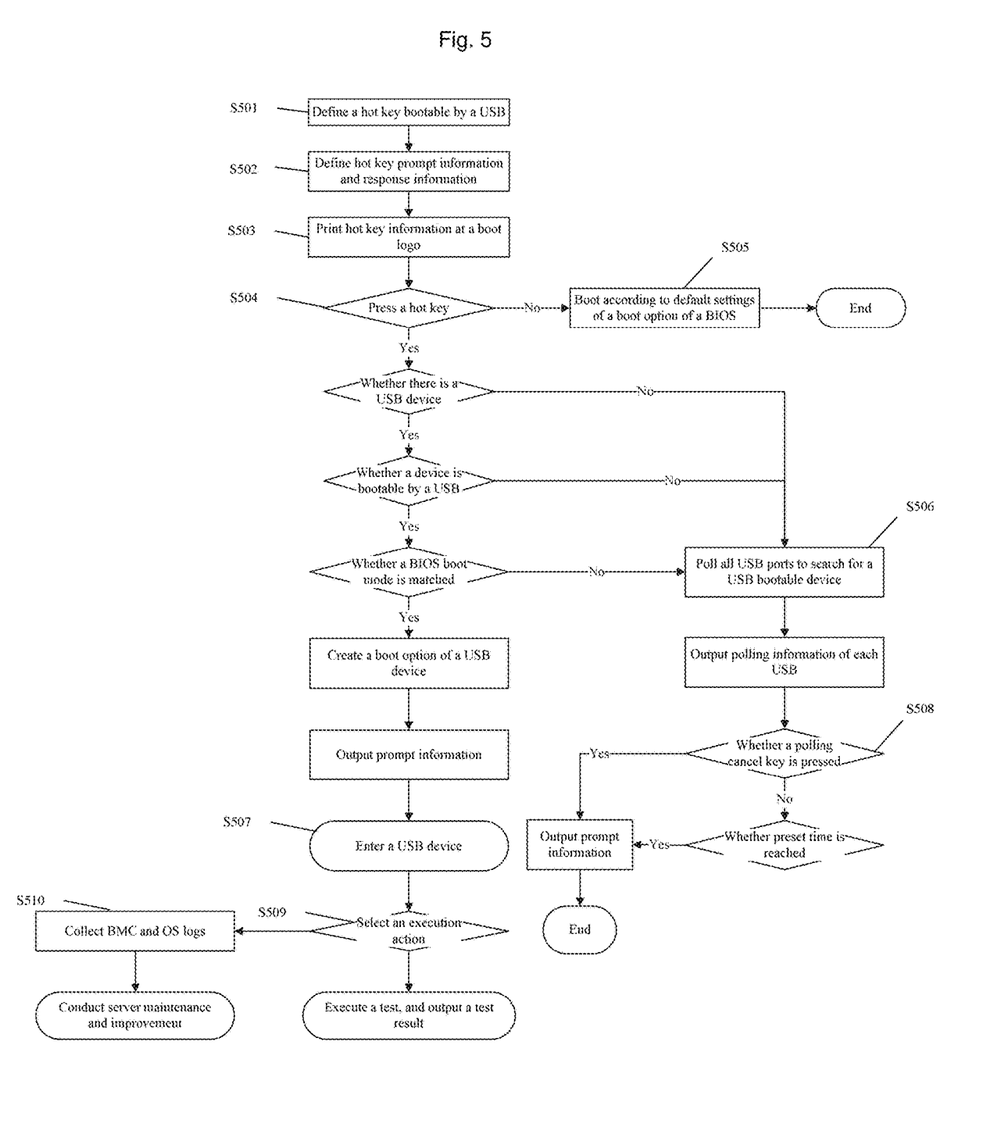
FIG. 5 is a schematic diagram of a flow of adjusting a boot option of a server according to an example of the disclosure.

The example provides a method for adjusting a boot option of a server. FIG. 5 is a schematic diagram of a flow of adjusting a boot option of a server according to an example of the disclosure. As shown in FIG. 5, the flow mainly includes the following operations:

S501: a hot key (that is, a first hot key that triggers an adjustment function of a boot option of a target server) of a USB bootable device, such as a [F5] key, is defined;

S502: prompt information of the first hot key and response information obtained after the first hot key is pressed are determined, and reference may be made to the following: the prompt information: Press [F5] to USB Device (that is, [F5] is pressed to trigger the adjustment function of the boot option of the target server); and the response information: [F5] is Pressed, Going to USB Device (that is, [F5] has been pressed and the USB device will be entered soon);

S503: the prompt information and the response information may be printed at a boot logo of the target server so as to ask a user to press the first hot key at this moment; and after the first hot key is pressed, the boot option is created for the plugged target USB device, and if the first hot key is not pressed after the boot logo of the target server is passed, it is considered that no requirement is set to enter the target USB device, and the server is booted according to default settings of the boot option of the BIOS;

S504: when the boot option is created for the plugged USB device after the first hot key is pressed, if the USB device is a bootable device (that is, a device type of the USB device is a target type), whether a file carried by the USB bootable device is a UEFI file or a Legacy file needs to be identified according to a current boot mode (a UEFI mode or a Legacy mode) of the BIOS, the boot mode of the BIOS needs to be matched with the file of the USB bootable device before the boot option may be successfully created, and meanwhile, information is printed to remind the user of the fact that the USB device is about to be entered; and otherwise, the boot option cannot be created successfully;

S505: after the first hot key is pressed, if no USB bootable device (that is, the target USB device) or no USB device is plugged into the server, the boot option cannot be created;

S506: for the case that the boot option cannot be created in S504 and S505, it is necessary to repeatedly check whether the USB bootable device is connected by adding a periodic timer event; in the checking, all USB ports on the server may be polled according to an order rule, and when all the USB ports are polled from USB Port 1, USB Port 2 . . . USB Port N, the user may be informed of information, such that the user may clearly know the next USB port to be polled; and in this case, if a USB device is to be plugged in, the user may wait at a next USB port, identify and match a plugged bootable USB device, and create a bootable option, so as to achieve a plug-and-play effect;

S507: after the first hot key is pressed, as long as the bootable option is successfully created, the USB device may be directly entered without any other operation; if the USB bootable device is not plugged in a polling process, polling may be automatically exited according to preset ending time, and then booting may be conducted (for instance, the operating system may be entered) according to a default booting order of the BIOS; and polling time may be freely set by the user, and a time range may be 1 min to 5 min;

S508: a second hot key [Ctrl+F5] is defined, and if the user attempts to exit a polling mode (that is, the polling detection) ahead of time, the user may press a hot key directly to cancel the polling mode;

S509: after the USB bootable device is entered, fault diagnosis and test execution may be selected to be conducted, where the test execution needs to integrate test tools into a system of the USB device, and output a test result after execution is completed; and S510: the fault diagnosis needs to read a system event log (SEL) of a baseboard management controller (BMC) through an intelligent platform management interface (IPMI) command, read an interface description language (IDL) log of the BMC through a restful interface of the BMC, enter the operating system (OS) through a USB device system, and read Dmesg, Mcelog, Message and other log information under the OS, such that maintenance and later improvement plans of the server are facilitated.

It should be noted that the boot option of the USB device is created for the USB bootable device (that is, the target USB device) of the server and the USB device is successfully entered. If booting fails, all the USB ports of the server may be repeatedly polled and checked by adding the periodic timer event until the boot option of the USB bootable device is successfully created and the USB device is entered. The polling is conducted from the USB Port 1 (the USB port 1) and the USB Port 2, . . . , and the USB Port N, the user may be informed of information during polling of each USB port. In the polling process, the USB bootable device may be plugged at any time so as to implement an operation of entering the USB device.

If the USB bootable device is not plugged in the polling process, polling may be automatically exited according to the preset ending time, and then booting may be conducted (for instance, the operating system may be entered) according to a normal booting order of the BIOS; and the polling time may be freely set by the user from 1 min to 5 min. If the user attempts to exit the polling mode ahead of time, the user may also press the second hot key directly to cancel the polling mode.

After the USB bootable device is entered, fault diagnosis and test execution may be selected to be conducted, where the test execution needs to integrate test tools into a system of the USB device, and output a test result after execution is completed. The fault diagnosis needs to read the SEL of the BMC through the IPMI command, read the IDL log of the BMC through the restful interface of the BMC, enter the OS through the USB device system, and read the Dmesg, Mcelog, Message and other log information under the OS, such that maintenance and later improvement plans of the server are facilitated.

According to the method for adjusting a boot option of a server provided by the disclosure, the USB bootable device may be easily entered only by pressing the first hot key, the server does not need to be rebooted when booting failure, the USB device may be entered again through polling and searching, and the user may be informed of information when polling each USB port, such that a plug-and-play effect is achieved. Meanwhile, a client may preset polling time according to an own use scene from 1 min to 5 min. After the time is finished, the polling mode may be automatically exited, and booting may be conducted (for instance, the operating system is entered) in the normal booting order of the BIOS. If the client attempts to exit the polling mode ahead of time, the client may directly press the hot key to cancel the polling mode, such that the operation of rebooting the server again is omitted, and production and test execution are facilitated. Fault diagnosis information of the client serves is collected after sale, so as to facilitate later server improvement. Thus, server quality, product competition and production and testing efficiency are improved, and labor cost is saved.

From the description of the embodiments, those skilled in the art may clearly understand that the methods according to the examples may be implemented through software plus a necessary general-purpose hardware platform, or through hardware. In most cases, the former is a better embodiment. With such understanding, the technical solution of the disclosure, in essence or from the view of part contributing to the related art, may be embodied in a form of a computer software product. The computer software product is stored in a storage medium (such as an ROM/RAM, a magnetic disk, and an optical disk) and includes several instructions used to enable a terminal device (which may be a mobile phone, a computer, a server, a network device, etc.) to execute the method of each example of the disclosure.

Figure 6:
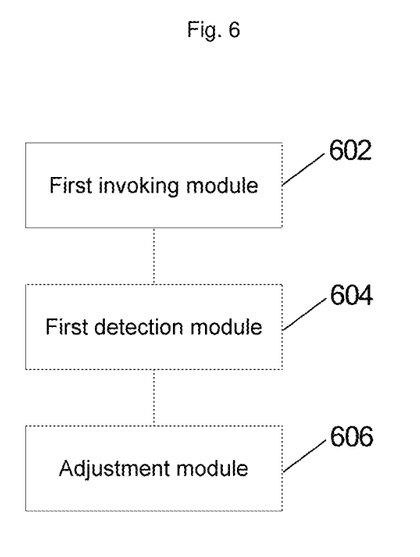
FIG. 6 is a structural block diagram of an apparatus for adjusting a boot option of a server according to an example of the disclosure.

FIG. 6 is a structural block diagram of an apparatus for adjusting a boot option of a server according to an example of the disclosure. As shown in FIG. 6, the apparatus includes:

a first invoking module 602 configured to invoke, in response to detecting failure of an adjustment operation executed for a boot option of a target server, a first detection parameter corresponding to the target server, where the first detection parameter is used to indicate a first detection order of all USB ports on the target server;

a first detection module 604 configured to detect a USB port connection state of the target server according to the first detection parameter, where the USB port connection state is used to indicate whether a USB port connected to a target USB device is provided on the target server; and an adjustment module 606 configured to adjust, in response to determining that the USB port connection state is used to indicate that a target USB port connected to the target USB device is provided on the target server, a boot option of a USB device to a target boot option of the target server, where the boot option of the USB device is used to instruct the target server to be booted through a USB device which is connected with the target server, and the target boot option is a boot option used with a highest priority when a system of the target server is booted.

Through the example, the target server corresponds to the first detection parameter used to indicate the first detection order of all the USB ports on the target server. If the boot option of the server fails to be adjusted, the first detection parameter may be invoked first, and the USB port connection state of the target server may be detected in the first detection order indicated by the first detection parameter.

Thus, whether there is a USB port connected to the target USB device on the target server can be determined. If the target USB port connected to the target USB device is provided on the target server, the boot option of the USB device is adjusted to the target boot option used by the target server with the highest priority when the system of the target server is booted. Thus, the boot option of the target server is successfully adjusted. That is, through the above operation mechanism, the server does not need to be rebooted after the boot option of the server fails to be adjusted, and all the USB ports on the target server may be continuously detected according to the first detection parameter. Thus, a lot of time wasted by rebooting of the server is saved, and adjustment efficiency of the boot option of the server is improved. Through the technical solution, a problem of low adjustment efficiency of the boot option of the server in the related art is solved, and a technical effect of improving adjustment efficiency of the boot option of the server is achieved.

In an illustrative example, the first detection module includes:
  a first determination unit configured to determine a current USB port to be currently detected in a polling order indicated by the first detection parameter;
  a first detection unit configured to detect a current connection state of the current USB port, where the current connection state is used to indicate whether the current USB port is connected to the target USB device;
  a second determination unit configured to, in response to determining that the current connection state is used to indicate that the current USB port is connected to the target USB device, determine that the USB port connection state is used to indicate that the USB port connected to the target USB device is provided on the target server, and determine the current USB port as the target USB port; and
  a third determination unit configured to determine, in response to determining that the current connection state is used to indicate that the current USB port is not connected to the target USB device, a next USB port to-be-detected as a next current USB port in the polling order.

In an illustrative example, the apparatus further includes:
a first determination module configured, after the current connection state of the current USB port is detected, to determine, in response to determining that the current connection state is used to indicate that the current USB port is not connected to the target USB device and the current USB port is a last USB port in the polling order, that the USB port connection state is used to indicate that the USB port connected to the target USB device is not provided on the target server.

In an illustrative example, the first invoking module includes at least one of the following:
  a first invoking unit configured to invoke a single-round order parameter corresponding to the target server and an exit condition parameter corresponding to the target server as the first detection parameter, where the single-round order parameter is used to indicate an order of polling all the USB ports in a single round of polling, and the exit condition parameter is used to indicate a condition of exiting polling detection of all the USB ports; and
  a second invoking unit configured to invoke a detection list corresponding to the target server as the first detection parameter, where all the USB ports are recorded in the polling order in the detection list.

In an illustrative example, the first invoking unit is further configured to conduct at least one of the following operations:
  the single-round order parameter corresponding to the target server and a polling frequency parameter corresponding to the target server are invoked as the first detection parameter, where the polling frequency parameter is used to indicate a frequency of polling all the USB ports; and
  a single-round order parameter corresponding to the target server and a polling time parameter corresponding to the target server are invoked as the first detection parameter, where the polling time parameter is used to indicate duration of polling all the USB ports.

In an illustrative example, the apparatus further includes at least one of the following:
  a first display module configured to determine a reference USB port to be detected next in the polling order in a process of detecting the current connection state of the current USB port; and generate and display first prompt information, where the first prompt information is used to indicate that the reference USB port is the next to-be-detected USB port;
  a second display module configured to generate and display second prompt information in a process of detecting the current connection state of the current USB port, where the second prompt information is used to indicate that the current USB port is a currently detected USB port.

In an illustrative example, the second display module includes:
  a first generation unit configured to generate the second prompt information, where the second prompt information is used to indicate that the current USB port is the currently detected USB port and indicate the polling order; and
  a first display unit configured to display the second prompt information.

In an illustrative example, the second display module includes:
  a second detection unit configured to detect whether the current USB port is connected to the USB device;
  a third detection unit configured to detect, in response to detecting that the current USB port is connected to the USB device, a device type of the USB device connected to the current USB port; and
  a fourth determination unit configured to determine, in response to determining that the device type is a target type, that the current USB port is connected to the target USB device.

In an illustrative example, the second detection unit is further configured to:
  access a file stored in the USB device; and
  determine, in response to determining that a boot file is accessed in the USB device, that the device type is the target type.

In an illustrative example, the apparatus further includes:
  a second detection module configured to detect whether an exit operation is executed on the target server in a process of detecting the USB port connection state of the target server according to the first detection parameter; and
  a stopping module configured to stop, in response to detecting the exit operation, execution of the operation of detecting the USB port connection state of the target server according to the first detection parameter.

In an illustrative example, the second detection module includes:
a second generation unit configured to generate third prompt information, where the third prompt information is used to indicate a trigger condition of the exit operation; and
a second display unit configured to display the third prompt information while detecting whether the exit operation is executed on the target server.

In an illustrative example, the apparatus further includes:
a second invoking module configured, before the first detection parameter corresponding to the target server is invoked, to invoke, in response to detecting that an adjustment function of the boot option of the target server is triggered, a second detection parameter corresponding to the target server, where the second detection parameter is used to indicate a second detection order of all the USB ports on the target server;
a third detection module configured to detect the USB port connection state of the target server in the second detection order; and
a second determination module configured to determine, in response to determining that the USB port connection state is used to indicate that no target USB port connected to the target USB device is provided on the target server, that failure of the adjustment operation executed for the boot option of the target server is detected.

In an illustrative example, the apparatus further includes:
a third invoking module configured, before the first detection parameter corresponding to the target server is invoked, to invoke, in response to detecting that an adjustment function of the boot option of the target server is triggered, a third detection parameter corresponding to the target server, where the third detection parameter is used to indicate a second port identifier of one USB port corresponding to the adjustment function;
a fourth detection module configured to detect whether the USB port indicated by the second port identifier is connected to the target USB device; and
a third determination module configured to determine, in response to detecting that the USB port indicated by the second port identifier is not connected to the target USB device, that failure of the adjustment operation executed for the boot option of the target server is detected.

In an illustrative example, the adjustment module includes:
a fourth detection unit configured to detect a first boot mode of a basis input output system (BIOS) carried by the target USB device, and detect a second boot mode of the BIOS currently used by the target server, where boot modes of the BIOS include a unified extensible firmware interface (UEFI) mode and a Legacy mode; and
an adjustment unit configured to adjust the boot option of the USB device to the target boot option of the target server according to the first boot mode and the second boot mode.

In an illustrative example, the adjustment unit is further configured to:
match the first boot mode and the second boot mode; and
adjust, in response to determining that the first boot mode and the second boot mode are consistent, the boot option of the USB device to the target boot option of the target server.

In an illustrative example, the apparatus further includes:
an obtainment module configured, after the first boot mode and the second boot mode are matched, to obtain, in response to determining that the first boot mode and the second boot mode are inconsistent, a boot option order from the target server, where the boot option order is a use order of the boot option supported by the target server; and
a booting module configured to boot the target server in the boot option order.

In an illustrative example, the apparatus further includes:
a fourth invoking module configured to invoke, after the boot option of the USB device is adjusted to the target boot option of the target server, a target program from the target USB device;
an execution module configured to execute, in response to determining that the target program is a program having a fault detection function, the target program to obtain a target log from the target server; and
a detection module configured to conduct fault detection on the target server according to the target log.

In an illustrative example, the execution module includes:
an execution unit configured to execute the target program to obtain a first log from a baseboard management controller (BMC) deployed on the target server and obtain a second log from an operating system (OS) corresponding to the target server; and
a fifth determination unit configured to determine the first log and the second log as the target log.

In an illustrative example, the execution unit is further configured to:
transmit an intelligent platform management interface (IPMI) command to the target server, where the IPMI command is used to instruct reading a system event log (SEL) from the BMC deployed on the target server, and reading an interface description language (IDL) log of the BMC from a restful interface corresponding to the BMC; and determine the SEL and the IDL log as the first log; and
obtain a Dmesg log, an Mcelog log and a Message log from the operating system corresponding to the target server, where the second log includes the Dmesg log, the Mcelog log, and the Message log.

It should be noted that all the modules may be implemented by software or hardware. In the latter casse, the modules are located in a same processor, or all the modules are separately located in different processors in any combination form, which is not restrictive.

An example of the disclosure further provides a non-volatile readable storage medium. The non-volatile readable storage medium stores a computer program. The computer program is configured to execute operations of any one of the method examples, when executed by a processor.

In an illustrative example, the non-volatile readable storage medium may include, but is not limited to, a universal serial bus (USB) flash disk, a read-only memory (ROM), a random access memory (RAM), a mobile hard disk, a magnetic disk, an optical disk, and various media capable of storing computer programs.

An example of the disclosure further provides an electronic device. The electronic device includes a memory and a processor. The memory stores a computer program. The processor is configured to run the computer program so as to execute the operations of any one of the method examples.

In an illustrative example, the electronic device may further include a transmission device and an input/output device. The transmission device is connected to the processor. The input/output device is connected to the processor.

Reference may be made to instances described in the examples and illustrative embodiments for instances in the example, which will not be repeated by the example herein.

Obviously, those skilled in the art should understand that all modules or operations of the disclosure may be implemented with a general-purpose computation apparatus, and may be centralized on a single computation apparatus or distributed on a network consisting of a plurality of computation apparatuses. The modules or operations may be implemented with program codes executable by the computation apparatus, such that the modules or operations may be stored in a storage apparatus so as to be executed by the computation apparatus. Moreover, in some cases, the operations shown or described may be executed in an order different from that herein, the modules or operations may be fabricated separately as individual integrated circuit modules, or a plurality of modules or operations in the modules or operations may be fabricated as a single integrated circuit module for implementation. Thus, the disclosure is not limited to any particular combination of hardware and software.

What are described above are merely optional examples of the disclosure and are not intended to limit the disclosure, and various changes and modifications may be made by those skilled in the art. Any modifications, equivalent substitutions, improvements, and the like within the principles of the disclosure are intended to be included within the protection scope of the disclosure.

What is claimed is:

1. A method for adjusting a boot option of a server, comprising:
    invoking, in response to detecting failure of an adjustment operation executed for a boot option of a target server, a first detection parameter corresponding to the target server, wherein the first detection parameter is used to indicate a first detection order of all universal serial bus (USB) ports on the target server;
    detecting a USB port connection state of the target server according to the first detection parameter, wherein the USB port connection state is used to indicate whether a USB port connected to a target USB device is provided on the target server; and
    adjusting, in response to determining that the USB port connection state is used to indicate that the target USB port connected to the target USB device is provided on the target server, a boot option of a USB device to a target boot option of the target server, wherein the boot option of the USB device is used to instruct the target server to be booted through a USB device which is connected with the target server, and the target boot option is a boot option used with a highest priority when a system of the target server is booted;
    wherein after adjusting the boot option of the USB device to the target boot option of the target server, the method further comprises: invoking a target program from the target USB device; executing, in response to determining that the target program is a program having a fault detection function, the target program to obtain a target log from the target server; and
    conducting fault detection on the target server according to the target log.

2. The method according to claim 1, wherein detecting the USB port connection state of the target server according to the first detection parameter comprises:
    determining a current USB port to be currently detected in a polling order indicated by the first detection parameter;
    detecting a current connection state of the current USB port, wherein the current connection state is used to indicate whether the current USB port is connected to the target USB device;
    in response to determining that the current connection state is used to indicate that the current USB port is connected to the target USB device, determining, that the USB port connection state is used to indicate that the USB port connected to the target USB device is provided on the target server, and determining the current USB port as the target USB port; and
    determining, in response to determining that the current connection state is used to indicate that the current USB port is not connected to the target USB device, a next USB port to-be-detected as a next current USB port in the polling order.

3. The method according to claim 2, wherein after detecting the current connection state of the current USB port, the method further comprises:
    determining, in response to determining that the current connection state is used to indicate that the current USB port is not connected to the target USB device and the current USB port is a last USB port in the polling order, that the USB port connection state is used to indicate that the USB port connected to the target USB device is not provided on the target server.

4. The method according to claim 2, wherein invoking the first detection parameter corresponding to the target server comprises at least one of the following operations:
    invoking a single-round order parameter corresponding to the target server and an exit condition parameter corresponding to the target server as the first detection parameter, wherein the single-round order parameter is used to indicate an order of polling all the USB ports in a single round of polling, and the exit condition parameter is used to indicate a condition of exiting polling detection of all the USB ports; and
    invoking a detection list corresponding to the target server as the first detection parameter, wherein all the USB ports are recorded in the polling order in the detection list.

5. The method according to claim 4, wherein invoking the single-round order parameter and the exit condition parameter corresponding to the target server as the first detection parameter comprises at least one of the following operations:
    invoking the single-round order parameter corresponding to the target server and a polling frequency parameter corresponding to the target server as the first detection parameter, wherein the polling frequency parameter is used to indicate a frequency of polling all the USB ports; and
    invoking a single-round order parameter corresponding to the target server and a polling time parameter corresponding to the target server as the first detection parameter, wherein the polling time parameter is used to indicate duration of polling all the USB ports.

6. The method according to claim 2, further comprising at least one of the following operations:
    determining a reference USB port to be detected next in the polling order in a process of detecting the current connection state of the current USB port; and generating and displaying first prompt information, wherein the first prompt information is used to indicate that the reference USB port is the next to-be-detected USB port;
generating and displaying second prompt information in a process of detecting the current connection state of the current USB port, wherein the second prompt information is used to indicate that the current USB port is a currently detected USB port.

7. The method according to claim 6, wherein generating and displaying second prompt information comprises:
generating the second prompt information, wherein the second prompt information is used to indicate that the current USB port is the currently detected USB port and indicate the polling order; and
displaying the second prompt information.

8. The method according to claim 2, wherein detecting the current connection state of the current USB port comprises:
detecting whether the current USB port is connected to the USB device;
detecting, in response to detecting that the current USB port is connected to the USB device, a device type of the USB device connected to the current USB port; and
determining, in response to determining that the device type is a target type, that the current USB port is connected to the target USB device.

9. The method according to claim 8, wherein detecting the device type of the USB device connected to the current USB port comprises:
accessing a file stored in the USB device; and
determining, in response to determining that a boot file is accessed in the USB device, that the device type is the target type.

10. The method according to claim 1, further comprising:
detecting whether an exit operation is executed on the target server in a process of detecting the USB port connection state of the target server according to the first detection parameter; and
stopping, in response to detecting the exit operation, execution of a operation of detecting the USB port connection state of the target server according to the first detection parameter.

11. The method according to claim 10, wherein detecting whether the exit operation is executed on the target server comprises:
generating third prompt information, wherein the third prompt information is used to indicate a trigger condition of the exit operation; and
displaying the third prompt information while detecting whether the exit operation is executed on the target server.

12. The method according to claim 1, wherein before invoking the first detection parameter corresponding to the target server, the method further comprises:
invoking, in response to detecting that an adjustment function of the boot option of the target server is triggered, a second detection parameter corresponding to the target server, wherein the second detection parameter is used to indicate a second detection order of all the USB ports on the target server;
detecting the USB port connection state of the target server in the second detection order; and
determining, in response to determining that the USB port connection state is used to indicate that no target USB port connected to the target USB device is provided on the target server, that failure of the adjustment operation executed for the boot option of the target server is detected.

13. The method according to claim 1, wherein before invoking the first detection parameter corresponding to the target server, the method further comprises:
invoking, in response to detecting that an adjustment function of the boot option of the target server is triggered, a third detection parameter corresponding to the target server, wherein the third detection parameter is used to indicate a second port identifier of one USB port corresponding to the adjustment function;
detecting whether the USB port indicated by the second port identifier is connected to the target USB device; and
determining, in response to detecting that the USB port indicated by the second port identifier is not connected to the target USB device, that failure of the adjustment operation executed for the boot option of the target server is detected.

14. The method according to claim 1, wherein adjusting the boot option of the USB device to the target boot option of the target server comprises:
detecting a first boot mode of a basis input output system (BIOS) carried by the target USB device, and detecting a second boot mode of the BIOS currently used by the target server, wherein boot modes of the BIOS comprise a unified extensible firmware interface (UEFI) mode and a Legacy mode; and
adjusting the boot option of the USB device to the target boot option of the target server according to the first boot mode and the second boot mode.

15. The method according to claim 14, wherein adjusting the boot option of the USB device to the target boot option of the target server according to the first boot mode and the second boot mode comprises:
matching the first boot mode and the second boot mode; and
adjusting, in response to determining that the first boot mode and the second boot mode are consistent, the boot option of the USB device to the target boot option of the target server.

16. The method according to claim 15, wherein after matching the first boot mode and the second boot mode, the method further comprises:
obtaining, in response to determining that the first boot mode and the second boot mode are inconsistent, a boot option order from the target server, wherein the boot option order is a use order of the boot option supported by the target server; and
booting the target server in the boot option order.

17. The method according to claim 1, wherein executing the target program to obtain the target log from the target server comprises:
executing the target program to obtain a first log from a baseboard management controller (BMC) deployed on the target server and obtain a second log from an operating system (OS) corresponding to the target server; and
determining the first log and the second log as the target log.

18. The method according to claim 17, wherein executing the target program to obtain the first log from the BMC deployed on the target server and obtain the second log from the OS corresponding to the target server comprises:
transmitting an intelligent platform management interface (IPMI) command to the target server, wherein the IPMI command is used to instruct reading a system event log (SEL) from the BMC deployed on the target server, and reading an interface description language (IDL) log of the BMC from a restful interface corresponding to the BMC; and determining the SEL and the IDL log as the first log; and obtaining a Dmesg log, an Mcelog log and a Message log from the operating system corresponding to the target server, wherein the second log comprises the Dmesg log, the Mcelog log, and the Message log.

19. A non-transitory non-volatile readable storage medium, comprising a stored program, wherein the program implements the following operations at runtime:

invoking, in response to detecting failure of an adjustment operation executed for a boot option of a target server, a first detection parameter corresponding to the target server, wherein the first detection parameter is used to indicate a first detection order of all universal serial bus (USB) ports on the target server;

detecting a USB port connection state of the target server according to the first detection parameter, wherein the USB port connection state is used to indicate whether a USB port connected to a target USB device is provided on the target server; and adjusting, in response to determining that the USB port connection state is used to indicate that the target USB port connected to the target USB device is provided on the target server, a boot option of a USB device to a target boot option of the target server, wherein the boot option of the USB device is used to instruct the target server to be booted through a USB device which is connected with the target server, and the target boot option is a boot option used with a highest priority when a system of the target server is booted;

wherein the program further implements the following operations after adjusting the boot option of the USB device to the target boot option of the target server at runtime: invoking a target program from the target USB device; executing, in response to determining that the target program is a program having a fault detection function, the target program to obtain a target log from the target server; and conducting fault detection on the target server according to the target log.

* * * * *